US009258797B2

(12) United States Patent
Skomra et al.

(10) Patent No.: US 9,258,797 B2
(45) Date of Patent: Feb. 9, 2016

(54) METHOD AND APPARATUS FOR A LOCAL POSITIONING SYSTEM

(71) Applicant: The Morey Corporation, Woodridge, IL (US)

(72) Inventors: Stewart A. Skomra, Poway, CA (US); Julian Durand, San Diego, IL (US)

(73) Assignee: TEMEDA, LLC, Chicago, IL (US)

(*) Notice: Subject to any disclaimer, the term of this patent is extended or adjusted under 35 U.S.C. 154(b) by 0 days.

(21) Appl. No.: 14/261,798

(22) Filed: Apr. 25, 2014

(65) Prior Publication Data

US 2014/0323149 A1    Oct. 30, 2014

Related U.S. Application Data

(60) Provisional application No. 61/816,231, filed on Apr. 26, 2013.

(51) Int. Cl.
*H04W 64/00* (2009.01)
*H04B 3/54* (2006.01)
*G01S 5/02* (2010.01)

(52) U.S. Cl.
CPC ............. *H04W 64/00* (2013.01); *G01S 5/0252* (2013.01); *H04B 3/542* (2013.01); *H04B 2203/5441* (2013.01); *Y02B 60/50* (2013.01)

(58) Field of Classification Search
CPC ......... H04W 4/04; G01S 5/10; G01R 31/025; G01R 19/0092; G01R 21/08; G01R 31/1272; G05F 1/66; H04L 67/10; H04L 1/0031; A61B 5/4041; H04B 1/401; H04B 1/74
USPC .................. 455/456.1; 398/26, 115; 324/522; 370/463; 702/2; 700/286; 600/310
See application file for complete search history.

(56) References Cited

U.S. PATENT DOCUMENTS

| 6,492,897 | B1 | 12/2002 | Mowery |
| 7,626,489 | B2 | 12/2009 | Berkman |
| 7,852,874 | B2 | 12/2010 | Binder |
| 8,275,486 | B2 | 9/2012 | Schweitzer, et al. |
| 2012/0068717 | A1* | 3/2012 | Gong et al. .............. 324/522 |
| 2012/0087212 | A1 | 4/2012 | Vartanian et al. |
| 2014/0226977 | A1* | 8/2014 | Jovicic et al. .............. 398/26 |

OTHER PUBLICATIONS

International Search Report issued in PCT/US14/35444 on Nov. 19, 2014.

* cited by examiner

*Primary Examiner* — Phuoc H Doan
(74) *Attorney, Agent, or Firm* — Vedder Price, P.C.

(57) ABSTRACT

A local positioning system uses a power delivery network throughout a facility to easily deploy inexpensive electromagnetic receivers for capturing location fingerprints from the transmission of wireless devices. These captured fingerprints are then compared with a database of similar fingerprints compiled from a facility surveying process. Location of the wireless device is inferred from the known location corresponding to that survey-derived fingerprint that is most highly correlated with the fingerprint derived from the wireless device. The known location may then be used to provide a logical mapping of the wireless device within facility floor plans or the like.

9 Claims, 5 Drawing Sheets

METHOD AND APPARATUS FOR A LOCAL POSITIONING SYSTEM

CROSS-REFERENCE TO RELATED APPLICATION

The instant application claims the benefit of Provisional U.S. Patent Application Ser. No. 61/816,231 entitled "LOCAL POSITIONING SYSTEM THROUGH AN ARRAY OF RF RECEIVERS ASSOCIATED WITH SPATIAL COORDINATES" and filed Apr. 26, 2013, the teachings of which are incorporated herein by this reference.

FIELD

The present invention relates generally to communication systems, and more specifically to a method and apparatus for a Local Positioning System through the use of an array of wireless receivers associated with known locations, e.g., spatial coordinates.

BACKGROUND

Position location solutions typically implement a receiver on the mobile device for which the location is to be determined. The receiver on the mobile device receives signals transmitted from known stationary points (e.g. geosynchronous satellites, terrestrial wireless base stations). The characteristics of the signals received at the mobile device (i.e. time of arrival, signal strength) are used to determine the location of the mobile device relative to the stationary transmitter locations. The location of the mobile device is determined is by calculating the distance of the device from each of the known stationary transmitters and then, with a previously known relationship between the stationary transmitters, using triangulation to isolate the position of the mobile receiver.

Stationary transmitters implemented in the form of geosynchronous satellites have the advantage of providing a very large coverage area, however, the low-power signal employed and the ever-changing contour and center of gravity of the earth requires continuous correction of reference distances between satellites and a sophisticated receiver on the mobile device. In addition to the sophisticated receiver requirements, the satellite signals are difficult to receive within buildings making it challenging to provide accurate location determinations when not outdoors. The difficulty of receiving satellite signals inside building is compounded by limitation of the resolution of position location using satellite positioning which is typically in the 3 to 10 meter range at best indoors.

For indoor applications, the low accuracy resolution makes it difficult to distinguish the location between adjacent rooms and floor levels in the facility. A 10-meter resolution, for example, might only isolate the mobile device location to one of any of six adjacent rooms each on one of three floors within a multi-story multi-room facility such as a patient ward in a hospital.

Terrestrial wireless transmitters such as wireless local area network access points (WLAN AP) and wireless wide area network base stations (WWAN BS) have been used for implementing the stationary transmitters for position location. These have the advantage of being compatible with relatively simple receivers in the mobile devices when compared to the geosynchronous satellite implementation alternatives and also have the benefit of providing data and voice communications services in addition to location. The disadvantage of WLAN AP and WWAN BS stationary transmitter-based position location systems is that the resolution accuracy is equal to or less than that of the geosynchronous satellite solutions making indoor applications difficult to implement.

A key inhibitor of the WLAN AP and WWAN BS transmitter-based position location systems is the use of signal strength as the primary determination of the distance from an individual stationary transmitter to the mobile receiver. Because of multi-path transmission and shadowing issues, the use of received signal strength to calculate distance results in, at best, 3 meter accuracy of these solutions and, consequently, in the same ambiguous mobile receiver location determination and restricted marketable applications of these types of solutions.

Significant improvements in the sophistication of WLAN AP and/or WWAN BS solutions for Local Positioning would need to be made coupled with advancements in the mobile device sophistication to provide a power-efficient, low-cost Local Positioning Solution that delivers location resolution fine enough to achieve room-by-room level location within a facility.

SUMMARY

The instant disclosure sets forth an alternative approach to Local Positioning determination that reuses existing wireless technologies and existing power delivery networks (alternating-current (AC) power infrastructures) to achieve the low-cost, power-efficient higher resolution desired result.

As described herein, in an embodiment, a local positioning system solution is provided using a power delivery network throughout a facility to easily deploy inexpensive electromagnetic receivers for capturing location fingerprints from the transmission of wireless mobile devices. These captured fingerprints are then compared with a database of similar fingerprints that was compiled from a facility surveying process. One or more fingerprints derived from a wireless device are compared with the survey-derived fingerprints and the location of the wireless device is inferred from the known location corresponding to that survey-derived fingerprint that is most highly correlated with the fingerprint derived from the wireless device. The known location may then be used to provide a logical mapping of the wireless device within facility floor plans or the like. In this manner, reliance upon sophisticated coordination of time-synchronized terrestrial wireless transmitters to achieve location identification is avoided. Rather, the energy and information contained within the energy of the transmitting mobile nodes is re-used to identify the location of the mobile node within the previously surveyed array of inexpensive Local Positioning System-Receiver Relays. The benefit of this solution includes low-cost implementation, room-level location resolution within the facilities and no need for expansion of the facility wireless LAN.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
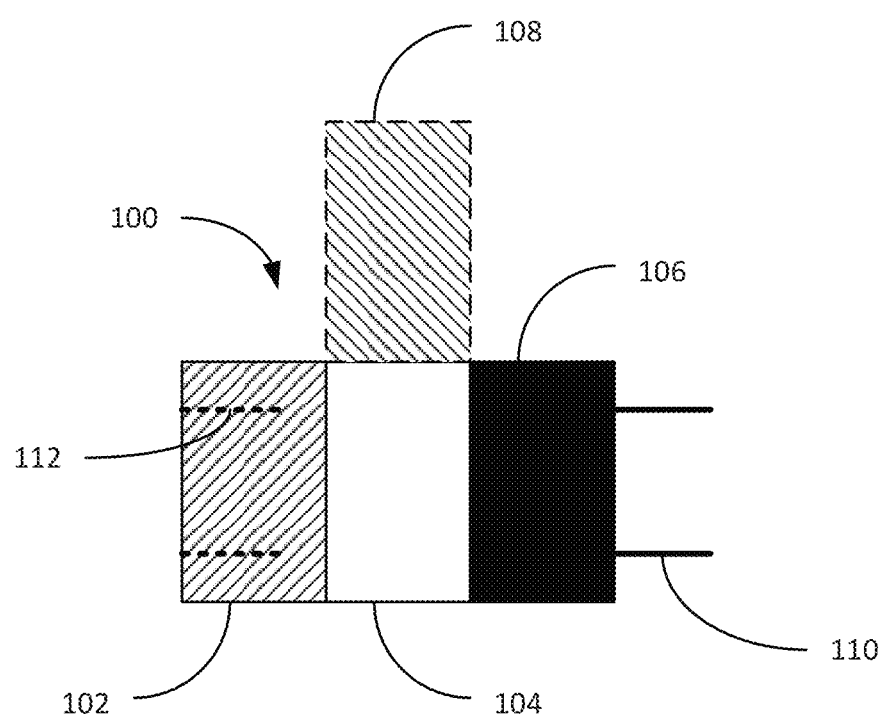
FIG. 1 is a schematic representation of a Local Positioning System Receiver-Relay (LPS-RR) in accordance with the instant disclosure.

Referring now to FIG. 1, a Local Positioning System Receiver-Relay (LPS-RR) comprises three primary sections: a Wireless Receiver 102, a Wireless to Power-Line Bridge or data bridge 104, and a Power Line Transceiver or power line communication interface 106. As shown the wireless receiver 102 communicates with the data bridge 104 that, in turn, communicates with the power line communication interface 106. Additionally, a pressure sensor 108 may also be provided in communication with the data bridge 104. Each LPS-RR has the ability to maintain accurate time, synchronized with a time base provided by one or more available networks and, consequently, other LPS-RR nodes. Each LPS-RR has a Unique ID (UID). In an embodiment, the data bridge 104, which may include a suitable programmable processing device (such as a microprocessor, microcontroller or the like) or programmable logic, also implements the time base and may also store the UID for that LPS-RR 100. The Wireless Receiver 102, implemented using well-known wireless receiver technology, is configured to accept a wide spectrum of electromagnetic energy input (e.g., radio frequency (RF) signals) and present information derived from such received wireless signals to the data bridge 104. Implemented as a simple receiver, and having no need for wireless transmission nor decoding of the electromagnetic energy into data, the Wireless Receiver 102 can be implemented as a very low-cost portion of the LPS-RR 100. As known in the art, the Wireless Receiver 102 comprises antennae and filters (to the extent required) and analog-to-digital conversion components to feed information regarding the received energy into the data bridge 104. The Wireless to Power-Line Bridge 104 receives the output of the Wireless Receiver 102 and packages this along with time stamp and the UID to feed as input to the power line communications interface 106. The power line communications interface 106 participates as a network node on a conventional power delivery network. In an embodiment, the power line communications interface 106 also contends for access to a shared data network implemented by the power delivery network to transmit the packaged data received from the data bridge 104 over the power delivery network. Techniques for implementing such data networks over conventional power delivery lines and networks, as well as implementations of transceivers capable to interfacing with such data networks, are well known in the art and, consequently, not described in further detail herein.

In an alternate embodiment, the wireless received 102 may be configured to operate with specific wireless protocols, e.g., the so-called "BLUETOOTH" or "WIFI" standards. In these instances, then, the wireless receivers 103 may facilitate location identification of specific types of devices, e.g., so-called smartphones and/or tablet computers.

As further shown in FIG. 1, the LPS-RR design accommodate insertion into an conventional power outlet through the use of appropriate male prongs 110 or the like. Using known circuitry, power required to operate the LPS-RR may be derived from this power source. Furthermore, using additional known circuitry, a pass-through electrical connector 112 (illustrated, in this example, as female receptacles) allows other conventional appliances that derive power from the conventional power delivery network to be plugged into the same outlet. This feature enables the LPS-RR 100 to be implemented without consuming a dedicated AC electrical outlet.

In other embodiments, a local positioning system can operate with the LPS-RR 100 communicating over backbone networks other than a power delivery-based networks. By way of non-limiting example, a mesh network could be incorporated as the backbone with the power line communication interface 106 being replaced by such a mesh transceiver.

Furthermore, and once again using known techniques, the LPS-RR 100 can act as a router-repeater receiving data packets from other LPS-RR nodes and providing a store-and-forward function that includes integrity checking of the data and reconditioning and re-amplification of the transmission signal over the backbone network.

As noted, the Wireless Receiver 102 does not need to be isolated to any specific wireless frequencies and could be implemented to receive a wide spectrum of electromagnetic energy thereby enabling the system within which the LPS-RR is implemented to support the detection and tracking of any device emitting electromagnetic energy.

Figure 2:
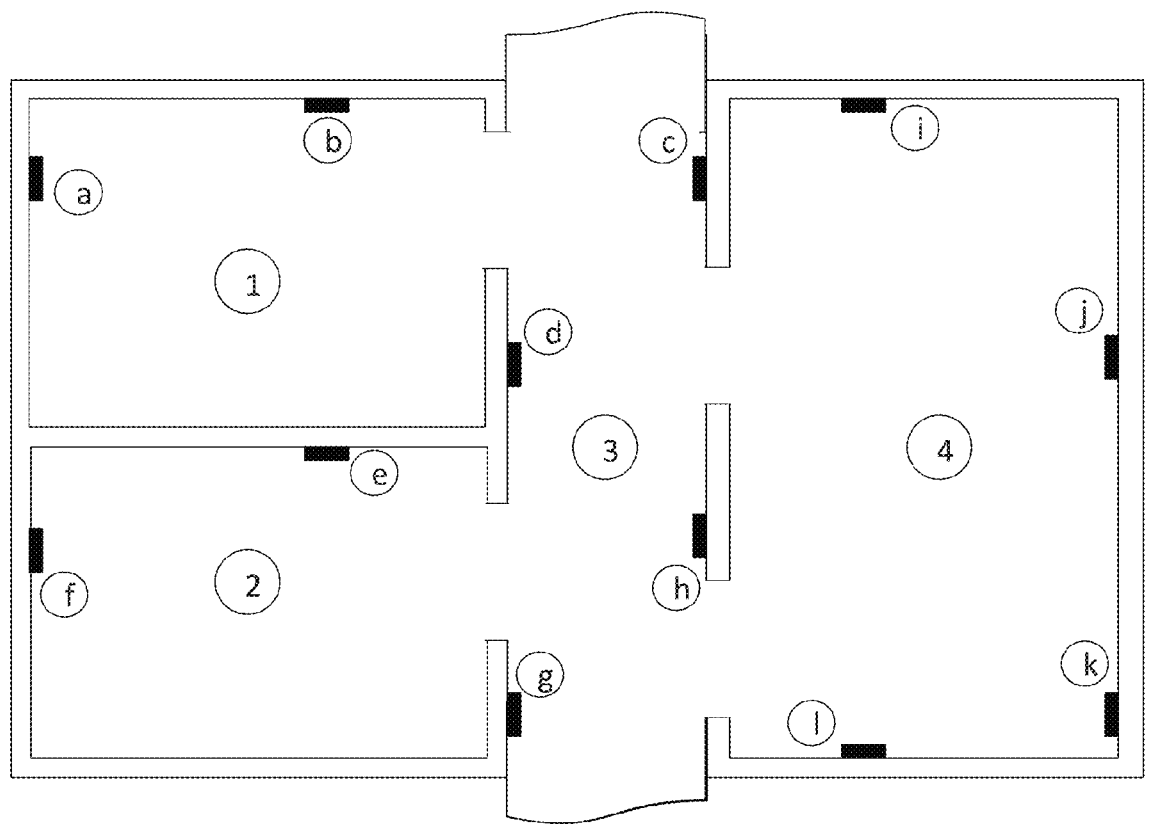
FIG. 2 is a diagram of an example of a Facility Floor Plan indicating placement of LPS-RRs in accordance with the teachings of the instant disclosure.

Referring now to FIG. 2, a Facility Floor Plan diagram is provided, illustrating a sample layout of a three room structure with an interconnecting corridor. The rooms are labeled as zones 1, 2, and 4 with the corridor labeled as zone 3. The diagram indicates the placement of LPS-RRs a and b in zone 1, e and f in zone 2, c, d, h and g in zone 3, and i, j, k, and l in zone 4.

Each of the LPS-RR nodes are inserted into power delivery electrical outlets at the respective locations. A survey process provides for a logical association of each LPS-RR and its UID with the zone and LPS-RR placement mapping as described above. Mapping of the specific longitude and latitude of each respective AC outlet where the LPS-RR is installed would further provide for direct geo-spatial referencing.

In an alternative embodiment, the pressure sensor 108, when provided, is calibrated to act as an altimeter, providing height information. Such pressure sensors 108 are known in the art. For example, with a default 2 m spacing (configurable) between floors in a building, it is possible to accurately estimate the height (e.g., in terms of building floors) of a given LPS-RR. Alternatively, when the system is used in a vehicle, the altimeter 108 can be used to detect mis-placed vehicles and/or cargo. For instance, a vehicle hidden from view in a mineshaft or buried underground would be able to communicate this vital location information to the service.

In another alternative, power line-based communications has the ability to estimate linear line distance to a specific power load. As noted above, each LPS-RR will have a Unique Identifier (UID) to identify itself to the system. Using linear distance combined with known building code data, combined with building blueprints, it will be possible to infer location in this manner. Further still, the combination of both height and inferred location of power plug may be rendered on a computer-rendered drawing of the floor plan. Where the floor plan includes location of power sockets, a "snap-to" algorithm may be used to predict the actual location of the LPS-RR "snapped" onto the closest electrical outlet.

Regardless, a facility layout of the type illustrated in FIG. 2 may be used to implement a Local Positioning System with an individual floor plan being used for each of the facility floors for which location determination services are desired. For multiple floors, and rather than relying the pressure sensor 108, a logical naming convention can be established to identify floor level and/or altitude in addition to the latitude and longitude locations.

Figure 3:
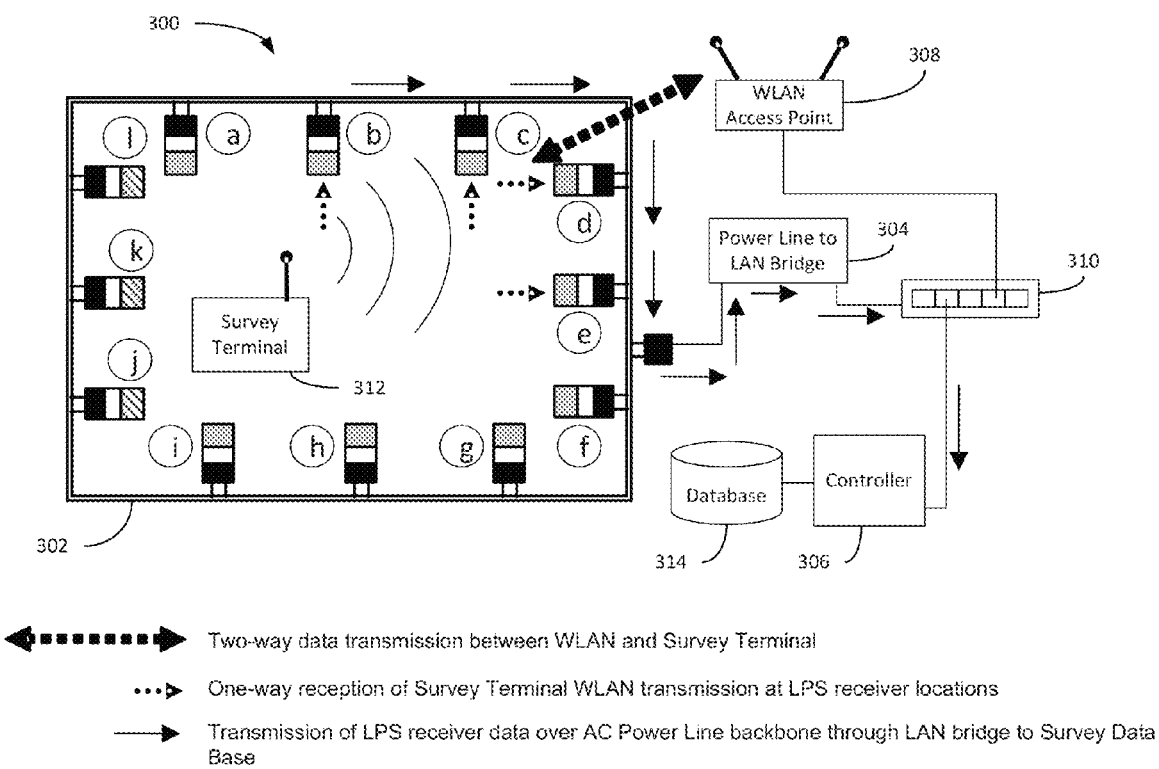
FIG. 3 is a schematic illustration of a Location Positioning System in accordance with the instant disclosure.

Referring now to FIG. 3, a Local Positioning System Example Architecture 300 is illustrated in which the LPS-RR nodes (a-1) communicate over a common Facility AC Power Line backbone or power delivery network 302 and transmit their data packets to a server or controller 306. In the illustrated embodiment, the controller 306 communicates with the power delivery network 302 through a separate Power Line to LAN Bridge 304 and network hub 310, as known in the art. It will be appreciated that the bridge 304 and/or the network hub 310 may not be included if the controller 306 is capable of communicating directly with the power delivery network 302. Further still, network bridging and routing equipment other than the bridge 304 and hub 310 may also be deployed as a matter of design choice. In an embodiment, the controller 306 provides shared data access for the surveying processes as well as for the run-time operation of the monitoring and tracking system. As known in the art, the controller 306 may comprise a computing platform comprising one or more processing devices operating under the control of instructions stored in memory devices operatively connected to the processing devices. As further shown, the controller 306 may be operatively coupled to a database 314, which may be used to store information received from the LPS-RRs as well as other information that may be derived by the controller 306, or that the controller 306 may receive from other devices, e.g., a survey terminal 312.

In the illustrated embodiment, there is a second data network 308 operatively connected to the controller 306, also via the network hub 310, and providing two-way communications between the Survey Terminal 312 and the controller 306. As shown in FIG. 3, the second data network 308 may comprise a WLAN as implemented by a WLAN-AP. Other suitable data networks will be apparent to those having ordinary skill in the art. The Survey Terminal 312 comprises a mobile wireless transmitter that is used to facilitate the logical mapping of the LPS-RR nodes to the facility layout. In an embodiment, the survey terminal 312 is able to send information identifying its location to the controller 306 via the second data network 308, e.g., with reference to FIG. 2, "zone 1," "between zone 1 and zone 3," etc. Additionally, the wireless transmitter of the survey terminal 312 can transmit wireless signals, specifically, wireless test signals to at least some of the LPS-RRs in proximity to any given location. Once again, to the extent that the LPS-RRs are capable of receiving a broad spectrum, or specific frequencies, of wireless signals, the survey terminal 312 may be configured to transmit correspondingly.

In another alternative, the functions provided by the controller 306 could be implemented within the Survey Terminal 312, thereby eliminating the need for the second data network 308 infrastructure, and with the addition of a Power Line to WLAN bridge function. In this case, a WLAN coupled to the power delivery network 302 could receive the relevant information from the LPS-RRs and transmit it back to the survey terminal 312.

Figure 4:
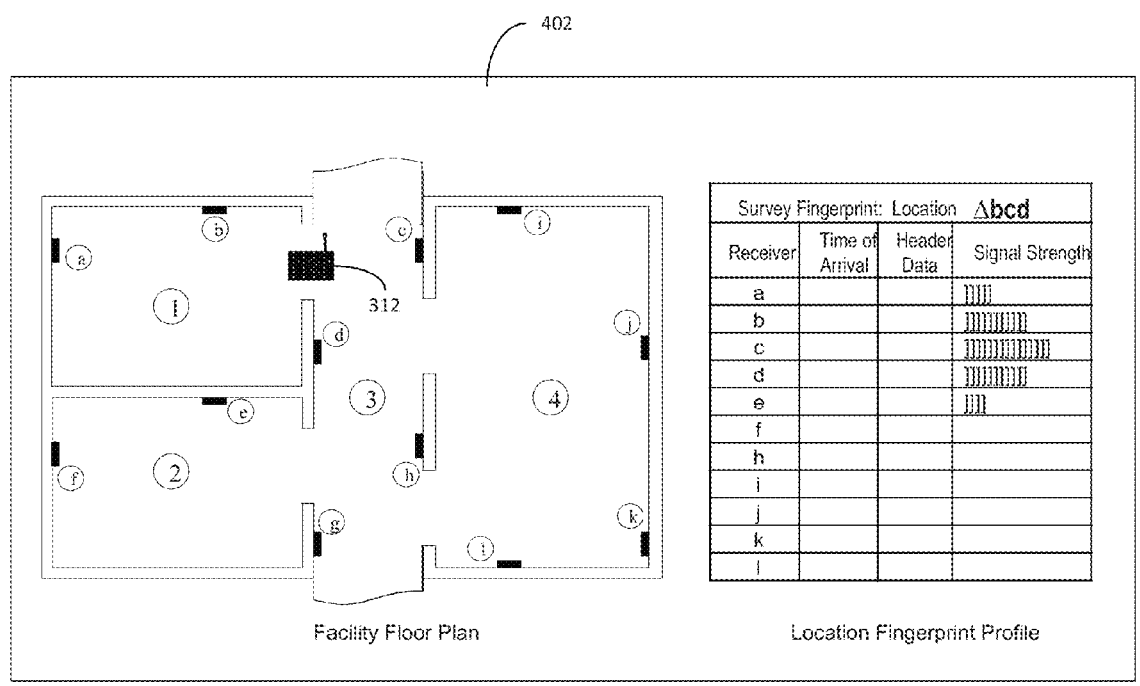
FIG. 4 is a diagram illustrating use of a Survey Terminal to create Survey Fingerprints in accordance with the instant disclosure.

Referring now to FIG. 4, an example of how the Survey Terminal 312 facilitates logical mapping of the array of LPS-RR nodes to the facility layout is illustrated. In particular, this is accomplished by using the two-way wireless data communication of the Survey Terminal to capture Survey Fingerprints that are manually associated during the survey process with a graphical representation of the facility layout 402.

Each wireless test transmission initiated by the Survey Terminal 312 from a point of interest within the facility will result in the LPS-RR nodes receiving energy from this test transmission and sending each respective sampling of the energy, i.e., test signal strength information, along with a time stamp derived from the common time base to the controller 306 over the Power Line backbone 302. The information associated with each of the LPS-RR individual sampling of the same transmission generated by the Survey Terminal (as determined by substantially contemporaneous time stamps, i.e., within a temporal window of predetermined length and/or a margin of error) are captured at the controller 306 and logged with each other to generate a unique location Survey Fingerprint.

An example of this is illustrated in FIG. 4, where the survey terminal 312 is located in a doorway between zone 1 and zone 3. In this instance, the survey terminal 312 has informed the controller 306 (which may be programmed to implement the graphical representation 402) of its location, named "Δbcd" in this example, based on the fact that the b, c and d LPS-RRs are in closest proximity to the survey terminal 312. Based on a wireless test signal transmitted by survey terminal, a first portion of the LPS-RRs—in this example the a through e LPS-RRs—receive the test signal and provide test signal strength information to the controller 306, along with corresponding time stamps indicating when the test signal strength information was derived. The controller 306 then identifies that received test signal strength information having substantially contemporaneous time stamps as being relevant to the fingerprint determination for the "Δbcd" location. As shown, then, the location fingerprint for the "Δbcd" location comprises the test signal strength information for the a through e LPS-RRs. As would be expected, those LPS-RRs closest to the survey terminal 312 during the test transmission correspond to the highest signal strengths in the location fingerprint. As shown in FIG. 4, the location fingerprint may include time of arrival (i.e., time stamp) information as well as header data received from each of the LPS-RRs. The time of arrival information may be used to indicate a measure of distance from the LPS-RR to the Server relative to other LPS-RRs, whereas the header data may comprise decoded data from the received signal header such as a Device ID (e.g. MAC ID).

The comparison of the same measured variables (i.e., test signal strength) from multiple LPS-RR nodes for a known location creates a unique profile against which future received data sets can be correlated to infer the location of electromagnetic energy transmitters within the facility. Furthermore, by capturing and storing Location (or Survey) Fingerprints associated with a plurality of specific locations throughout the facility, a database of Location Fingerprints (as stored, for example, in the database 314} that can be used as a reference from which to determine the location of devices moving throughout the facility.

That is, after the location fingerprints have been established as described above, non-test wireless transmissions, i.e., wireless transmissions from devices to be tracked, may be received by the LPS-RRs. Specifically, as a wireless device moves and transmits at various locations throughout the facility, a second portion of the LPS-RRs may receive the signals and derive signal strength information that is subsequently transmitted, along with corresponding time stamps, to the controller 306. In turn, the controller can correlate various received, non-test signal strength information based on substantially contemporaneous time stamps and compare this non-test signal strength information with the various stored location fingerprints. Using known comparison techniques, the controller can then identify a specific location fingerprint having test signal strength information that best correlates with the non-test signal strength information. Based on this best match, the controller 306 can infer that the wireless device in question is in substantial proximity to the known location associated with the best-matching location fingerprint. Using this inferred location information, then, the controller 306 can display the wireless device's location on the graphical representation 402 using known techniques.

Using the survey terminal technique will identify specific geo spatial points with a high degree of accuracy. In another embodiment, using the well-known technique of trilateration, it is also possible to detect the position of a wireless sensor in three-dimensional space. In this case, the wireless sensor is equipped to be compatible with a surrounding wireless transmitting infrastructure. For example, if the deployed infrastructure is based on the "WIFI" standard, the sensor would need to be appropriately equipped to receive such signals. Additionally, the wireless sensor also includes a time base synched with the infrastructure. With these capabilities in place, it is possible to calculate distance between the sensor and any particular LPS-RR (now each equipped to include wireless transmitter facilities) by measuring data round trip time. Using trilateration, if the sensor is able to view only one infrastructure node (LPS-RR), it will be able to calculate its distance to the LPS-RR as the radius of sphere centered on the LPS-RR. With visibility of a second LPS-RR, the two intersecting spheres will now provide a circle of possible coordinates where the sensor can be located. A third LPS-RR narrows the position to two locations on the circle, and the visibility of a fourth LPS-RR provides very accurate location information.

Furthermore, as known in the art, trilateration accuracy is increased by minimizing clock bias. That is, since it is assumed that all clocks have a common bias in addition to a bias per device, accounting for the common clock bias increases accuracy. Trilateration and clock bias computation may be computed simultaneously using least-squares error minimization algorithms, whereby, starting from an initial position estimate, the algorithm iterates until the minimum error is achieved. In those instances where the wireless sensor can only view one LPS-RR infrastructure node, it may calculate a coarser position by assuming it is at the centroid of that node.

If the wireless sensor can connect to two or three LPS-RR nodes, it can use Observed Time Difference of Arrival (OTDOA) between the nodes to better calculate its position based on the knowledge that it is closer to one LPS-RR than another as identified by the OTDOA.

Figure 5:
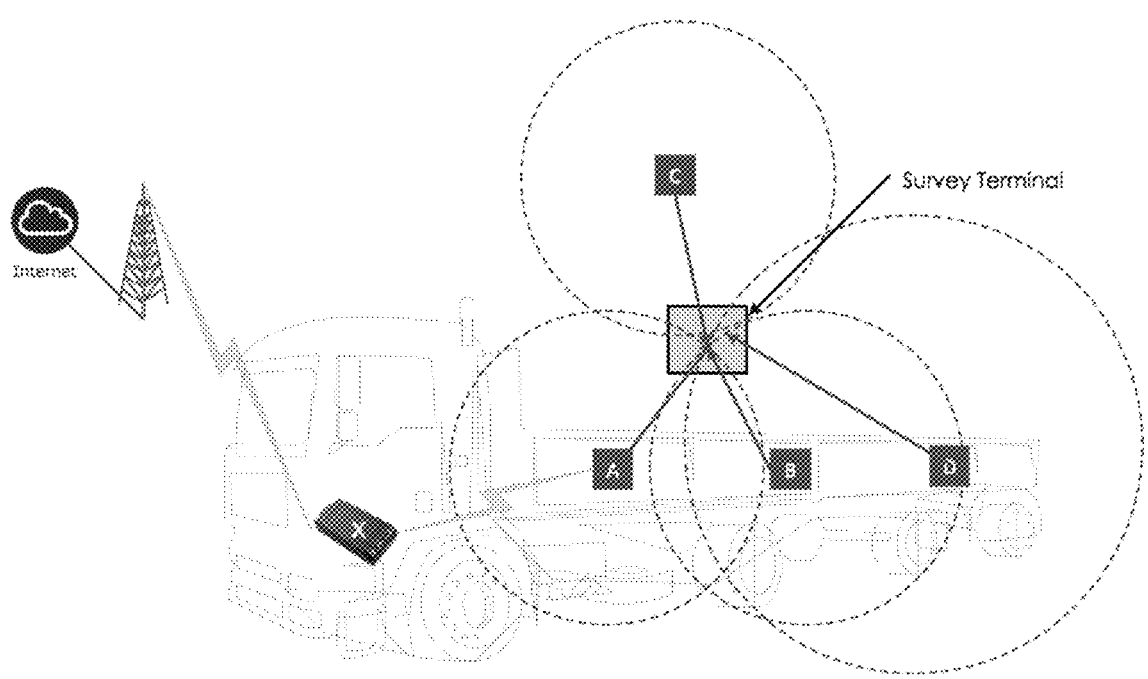
FIG. 5 is a diagram illustrating an embodiment of the instant disclosure implemented in a vehicle setting.

FIG. 5 shows a similar deployment to the facility-based embodiments described above, but in a vehicle. Here the LPS-RR nodes are labeled A, B, C and D. Nodes A, B and D are positioned at known locations along a truck bed, with C positioned on the roof of the container. With trilateration, as described earlier, it is possible to locate the Survey Terminal—a LPS-RR equipped object—to within 10 centimeters. Coupled with further knowledge of particular container types and/or contents, this allows for very accurate location within a container load. It is possible to infer, for example, that a delicate parcel may be at the bottom of several heavy parcels putting it at risk, or that a particular pharmaceutical product that needs to maintain a particular temperature will heat up more quickly if placed at the top of a container.

Equipping each LPS-RR node, either in the infrastructure or on the objects themselves, with additional sensors (for example, accelerometers, temperature, humidity, etc) provides detailed information on actual state for each specific area rather than a generalized one sensor reading for the entire cargo.

Objects with an attached LPS-RR sensor are visible to the infrastructure within the container or vehicle. If they move, it is possible to issue an alert. If the object moves to limits of the infrastructure range, a high priority alert can be sent. If the objects proceed to lose contact with the vehicle, it can be assumed that the cargo is being unloaded. If the container or vehicle is not in the designated unloading zone, the highest priority alert can be sent with last known position information including latitude, longitude, altimeter reading, heading and speed.

Geo-fenced loading and unloading zones may be identified so that approved loading and unloading may take place to automatically provide governance of the load integrity.

Actual and relevant GPS position may be calculated if a node 'X' is connected to the vehicle or container physically and wirelessly connected to the infrastructure nodes (LPS-RR). X is a device with GPS, a cellular modem and a local area wireless capability. Knowing the physical distance from X to each of nodes A, B, C and D provides high resolution location data to these nodes.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. An apparatus for use in a local positioning system, the device comprising:
a power line communications interface, configured to mate and electrically communicate with a power outlet connected to a power delivery network, the power line data interface further configured to transmit data via a data network;
a wireless transceiver that receives wireless signals and outputs corresponding signal strength information; and
a data bridge, operatively connected to the power line communications interface and the wireless receiver, that receives the signal strength information from the wireless receiver and sends the signal strength information and a time stamp to the power line communications interface for transmission via the data network, wherein the data bridge includes a unique identification and sends the unique identification with the signal strength information and the time stamp to the power line communications interface for transmission via the data network.

2. A local positioning system, comprising:
a plurality of local positioning receiver relays configured to mate and electrically communicate with corresponding ones of a plurality of power outlets connected to a power delivery network, each of the local positioning receiver relays operative to transmit, via a first data network, signal strength information relative to wireless signals received thereby and time stamps associated with the signal strength information;
a controller operatively connected to the plurality of local positioning receiver relays via the first data network; and
a wireless survey terminal operatively connected to the controller via a second data network and operative to transmit wireless signals that may be received by the plurality of local positioning receiver relays, wherein the wireless survey terminal transmits information identifying a plurality of known locations to the controller via the second data network, each of the plurality of known locations in proximity to at least a first portion of the plurality of local positioning receiver relays, wherein, for each of the plurality of known locations, the wireless survey terminal further transmits wireless test signals thereby causing each of the first portion of the plurality of local positioning receiver relays to transmit test signal strength information and time stamps to the controller via the first data network, and wherein the controller stores, for each of the plurality of known locations, a location fingerprint to provide a plurality of location fingerprints, each of the plurality of location fingerprints comprising that test signal strength information corresponding to the known location and having substantially contemporaneous time stamps.

3. The system of claim 1, wherein the first data network is the power delivery network.

4. The system of claim 1, wherein the first data network is first wireless network.

5. The system of claim 1, wherein the second data network is a second wireless network.

6. The system of claim 1, wherein a second portion of the plurality of local positioning receiver relays are operative to receive a non-test wireless signal from a wireless device and, in response to the non-test wireless signal, to transmit non-test signal strength information and time stamps to the controller via the first data network, and wherein the controller compares that non-test signal strength information having substantially contemporaneous time stamps with the plurality of location fingerprints and identifies the know location corresponding to that location fingerprint that best matches the non-test signal strength information.

7. A method for use in a local positioning system, the method comprising:

receiving, by a controller from each of a first portion of a plurality of local positioning receiver relays via a first data network, test signal strength information and a time stamp responsive to a wireless test signal transmitted by a wireless survey terminal and received by the local positioning receiver relay;

receiving, by the controller from the wireless survey terminal via a second data network, information identifying a known location, the known location in proximity to the first portion of the plurality of local positioning receiver relays;

storing, by the controller in association with the information identifying the known location, a location fingerprint comprising that test signal strength information corresponding to the known location and having substantially contemporaneous time stamps.

8. The method of claim 7, wherein the first data network is the power delivery network.

9. The method of claim 7, further comprising:

receiving, by the controller from each of a second portion of the plurality of local positioning receiver relays via the first data network, non-test signal strength information and time stamps response to a non-test wireless signal from a wireless device; and comparing, by the controller, that non-test signal strength information having substantially contemporaneous time stamps with the location fingerprint and identifying the know location corresponding to the location fingerprint when the non-test signal strength information substantially matches the location fingerprint.

* * * * *